Feb. 6, 1934.  W. E. GRAY  1,945,741
SCREW DRIVER
Filed Feb. 9, 1933
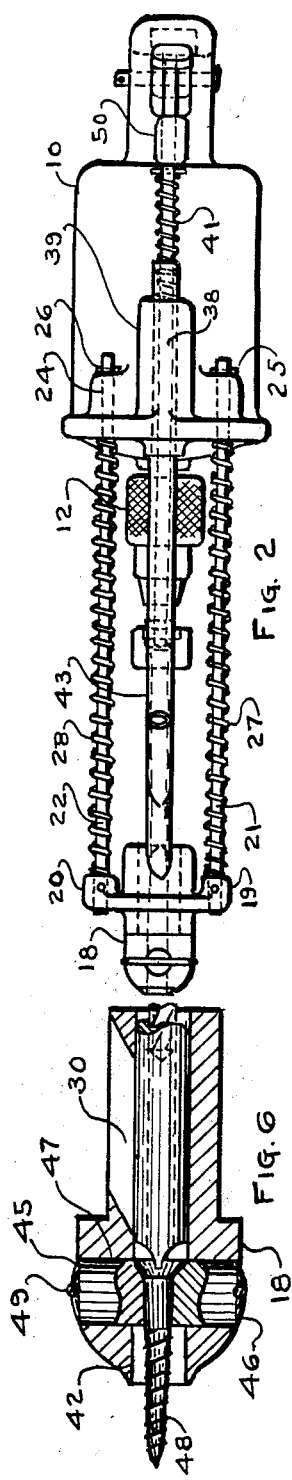
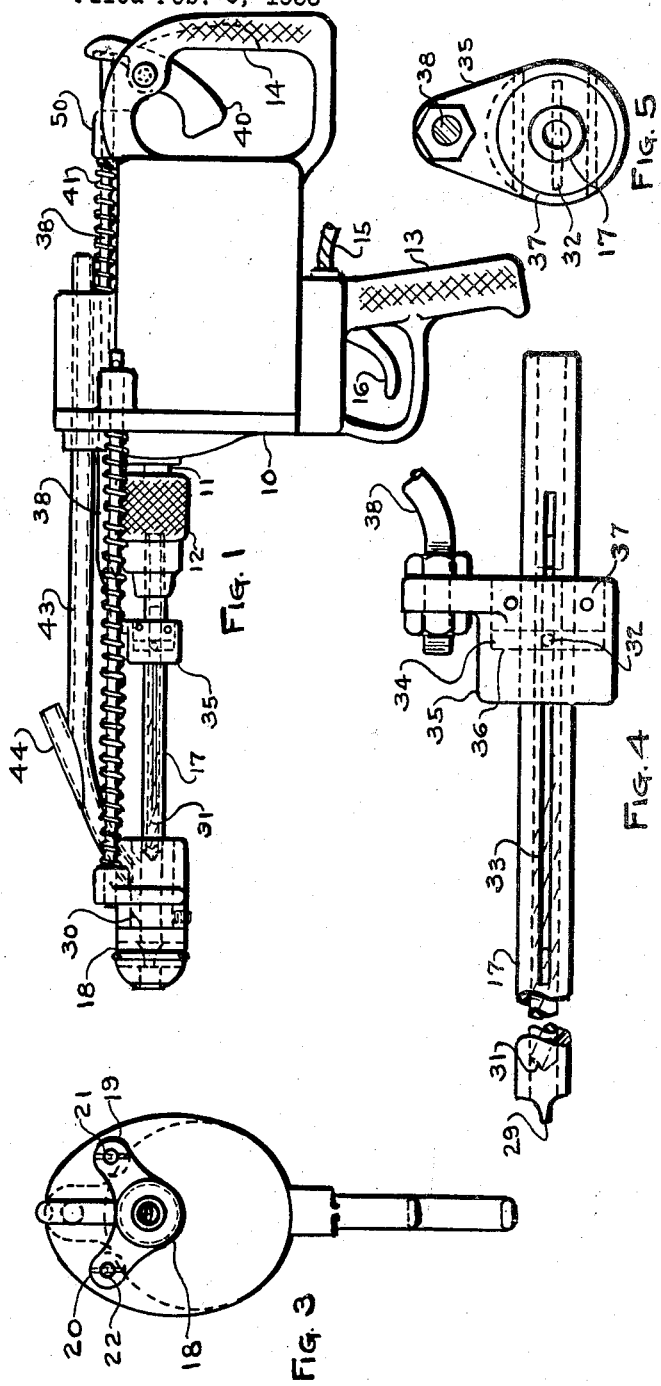
INVENTOR
Winfield E. Gray
BY
Chas. Williamson
ATTORNEY Patented Feb. 6, 1934

1,945,741

UNITED STATES PATENT OFFICE 1,945,741

SCREW DRIVER

Winfield E. Gray, Pawtucket, R. I.

Application February 9, 1933. Serial No. 655,969

1 Claim. (Cl. 144—32)

The procedure ordinarily followed in fastening pieces of material together with wood screws, is to drill a hole somewhat smaller than the screw, insert a screw, and drive it home with a screw driver. This necessitates at least two tools, and several manual operations. I combine the drill and screw driver in one unit, with a means for feeding the screws, and means for firmly holding them in place to be driven. This is conducive to ease of handling and speed, and the number of screws a man can insert per hour is greatly increased.

My invention is to be understood as consisting in whatever is described by or is included within the terms or scope or legal meanings of the appended claim.

Referring to the drawing:

Fig. 1 is a front elevation of one embodiment of my invention;

Fig. 2 is a plan of Fig. 1;

Fig. 3 is an end elevation of Fig. 1;

Fig. 4 is an enlarged view of the screw driver and drill of Fig. 1;

Fig. 5 is an end elevation of Fig. 4;

Fig. 6 is enlarged section of the pilot head of Fig. 1.

A housing 10 contains an electric motor, one end 11 of the armature of the motor protruding from the housing, and a chuck 12 is fastened to this end of the armature. The housing is also provided with handles 13 and 14 for convenience in operating and the enclosed motor is connected with a source of electrical power by cable 15, through an "on and off" switch operated by trigger 16.

Hollow screw driver 17 is gripped at one end by chuck 12, and the other end is piloted in pilot head 18. This pilot head 18 has lugs 19 and 20 in which are fastened one end of rods 21 and 22, the other ends of these rods being free to slide in holes 23 and 24 in housing 10 but being prevented from coming out of these holes by stop pins 25 and 26. Coil springs 27 and 28 normally hold pilot head 18 in the position illustrated in Fig. 1 where stop pins 25 and 26 abut housing 10, and the driving end 29 of hollow screw driver 17 is just within the pilot head 18, leaving slot 30 uncovered, but head 18 can move toward housing 10 against the pressure of these springs.

A drill 31 is slidable in hollow screw driver 17 but is rotated by it through pin 32 which passes through the drill, slots 33 in screw driver 17, and collar 34. Collar 34 is free to rotate in head 35, as is screw driver 17. Head 35 has a shoulder against which one side of collar 34 abuts, the other side of the collar abutting against bushing 37 fast in head 35, so that longitudinal movement of the head imparts longitudinal movement to drill 31 thru collar 34 and pin 32. Screw driver 17 is incapable of longitudinal movement as it is held by chuck 12. Head 35 is prevented from rotation by rod 38 which is slidable in lug 39 of housing 10. Longitudinal movement may be imparted to rod 38 and hence to head 35 and drill 31 by finger lever 40 in one direction, and spring 41 in the other direction.

Pilot head 18 has a longitudinal hole 42 in which screw driver 17 is slidable and has a slot 30 connected to tube 43, one end of which is slidable in lug 39 of housing 10, and which is provided with a branch 44. Pilot head 17 also contains two opposed detents 45 and 46 slidable in a hole 47 in head 18, the axis of this hole being perpendicular to and intersecting hole 42. The detents have their inner faces formed to hold a screw 48, and are normally forced toward each other by spring 49 far enough to grip a screw, but not far enough but what they may clear drill 31.

The operation is as follows. The operator starts the motor by switch finger 16, and placing head 18 touching the work at the desired point, operates lever 40, to move drill 31 longitudinally in screw driver 17 and through head 18 into the work. When the hole is drilled to the desired depth, which may be governed by lever 40 abutting lug 50, or by any other convenient means, the operator releases lever 40, and the drill returns to its original position by the action of spring 41. The operator then inserts a screw in tube 43, or this tube may be connected with a reservoir of screws. The screw slides down through slot 30 into pilot head 18, when it is located and prevented from falling out by detents 45 and 46. The operator, with head 18 resting against the work, presses housing 10 toward the work, rods 21 and 22 sliding in the housing and springs 27 and 28 compressing. This movement causes screw driver 17 to slide in head 18, its end 29 entering the slot in screw 48, and revolving the same as screw driver 17 is being revolved by chuck 12. Further movement of housing 10 toward the work causes screw driver 17 to drive screw 48 into the work, detents 45 and 46 being pushed outwards against the pressure of spring 49. When the screw has been driven home, releasing the pressure on housing 10 causes the apparatus to return to its original position, and the cycle is ready for repetition.

What I claim is:

The combination of a hollow screw driver, a drill slidable in the hollow screw driver and rotatable with it, a pilot head, means for revolvably supporting the screw driver in the head and means for feeding screws to the head.

WINFIELD E. GRAY.